(No Model.) 7 Sheets—Sheet 1.

W. TRAFFORD.
SIGNALING APPARATUS.

No. 392,766. Patented Nov. 13, 1888.

(No Model.)  7 Sheets—Sheet 2.

W. TRAFFORD.
SIGNALING APPARATUS.

No. 392,766. Patented Nov. 13, 1888.

Attest:
Geo. H. Potts.
J. A. Hovey.

Inventor:
Wesley Trafford.
by Munn & Philipp
Attys.

(No Model.) 7 Sheets—Sheet 3.

W. TRAFFORD.
SIGNALING APPARATUS.

No. 392,766. Patented Nov. 13, 1888.

Attest:
Geo. H. Potts
J. A. Hovey.

Inventor:
Wesley Trafford.
by Munson & Philipp
Attys (No Model.) 7 Sheets—Sheet 4.

W. TRAFFORD.
SIGNALING APPARATUS.

No. 392,766. Patented Nov. 13, 1888.

Attest:
Geo. H. Potts.
J. A. Hovey.

Inventor:
Wesley Trafford.
by
Newman & Philipp
Attys.

(No Model.) 7 Sheets—Sheet 7.

W. TRAFFORD.
SIGNALING APPARATUS.

No. 392,766. Patented Nov. 13, 1888.

Attest:
Geo. H. Potts.
J. A. Hovey.

Inventor:
Wesley Trafford.
by Munson & Philipp
Attys.

United States Patent Office.

WESLEY TRAFFORD, OF NEW YORK, N. Y., ASSIGNOR, BY MESNE ASSIGN-
MENTS, TO ELIZABETH R. TRAFFORD, OF SAME PLACE.

SIGNALING APPARATUS.

SPECIFICATION forming part of Letters Patent No. 392,766, dated November 13, 1888.

Application filed March 28, 1887. Serial No. 232,636. (No model.)

*To all whom it may concern:*

Be it known that I, WESLEY TRAFFORD, a citizen of the United States, residing at New York, county of New York, and State of New York, have invented certain new and useful Improvements in Signaling Apparatus, fully described and represented in the following specification and the accompanying drawings, forming a part of the same.

This invention relates to an annunciator or alarm apparatus which is especially adapted for use in hotels, but which can be applied to many other uses, the object of the invention being to provide a system by which any one or more of a number of annunciators, indicators, or alarms located in different rooms or different places will be automatically operated at any predetermined time from a single clock or similar mechanism located at another and distant point.

The invention while applicable to many different uses is especially adapted for use in hotels as a means of arousing guests who desire to be called at some particular time, thus avoiding the necessity of keeping a record at the hotel-office of the calls to be made and relieving the clerk or attendant of this trouble or responsibility. For the purpose, therefore, of giving a knowledge of the practical organization and application of the invention, it is herein illustrated and will be described as applied to a call system of this character. In such a system there is located in each room or place where a call is to be made an instrument containing an alarm mechanism somewhat similar to the alarm mechanism of an ordinary clock, while in the office, or at some other convenient point, is located an ordinary clock or other time mechanism. This clock is provided with a circuit-closing device, which moves synchronically with the hour-hand, and as the hand passes around the dial, closes successively a number of electrical circuits corresponding to the different hours or fractions of an hour. Each of these circuits passes through each room or place where one of the alarm mechanisms is located. Each alarm mechanism is provided with an electro-magnet located in a loop connected to each circuit, which, when, energized, withdraws a detent and permits the alarm mechanism to operate. Each room is provided with a switch mechanism consisting of a number of switches and circuit-closers which are so arranged that the current passing through any one of the circuits when it is closed by the movement of the clock in the office may be allowed to pass directly through the circuit or may be diverted and caused to pass through the loop and electro-magnet and thus sound the alarm. From this it results that in order to be aroused at any particular hour a guest has only to set the switch of the circuit corresponding to that hour in such position that when the clock in the office indicates the desired hour and closes the circuit the current instead of passing directly through the circuit will be diverted and pass through the electro-magnet of the alarm mechanism and thus release that mechanism and sound the alarm.

As a full understanding of the invention can only be given by an illustration and a detailed description of the mechanism and organization embodying it, all further preliminary description will be omitted and such a detailed description given, reference being had to the accompanying drawings, in which—

Fig. 14 is a diagram illustrating an addition to the system, which will be hereinafter referred to.

Figure 1:
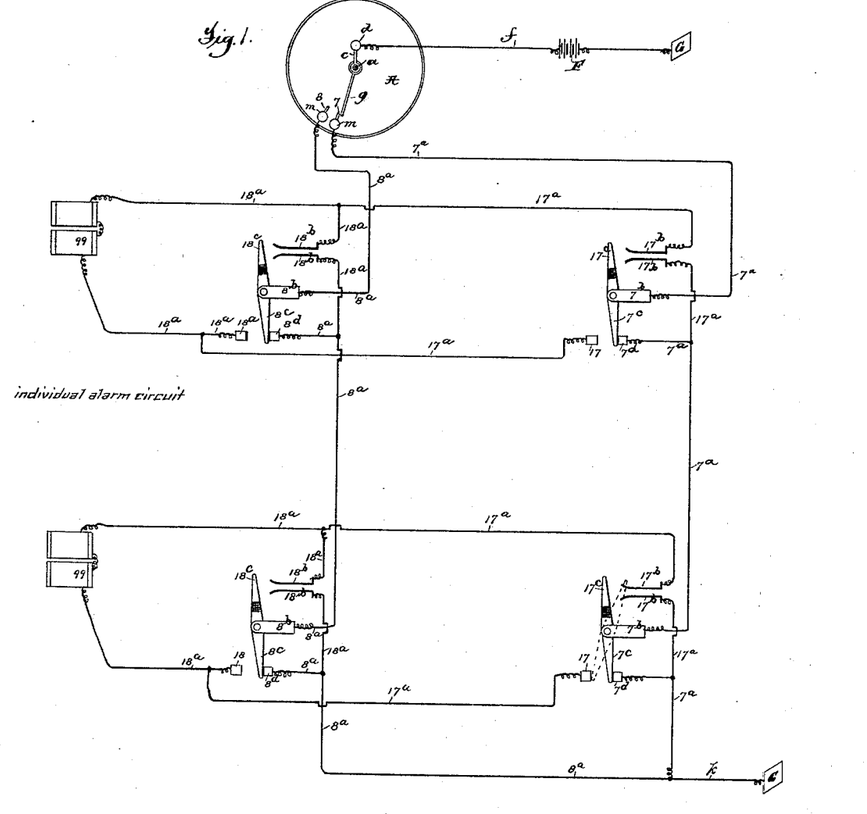
Figure 1 is a diagrammatic view illustrating the electrical connections by which the system is operated.
Figure 2:
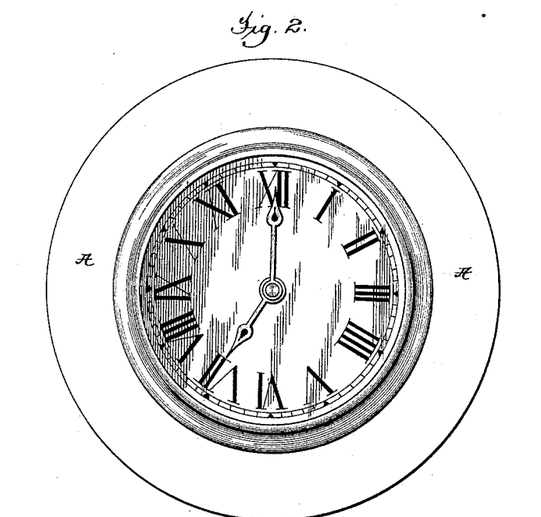
Fig. 2 is a view of the face of an ordinary clock suitable for operating the system.
Figure 3:
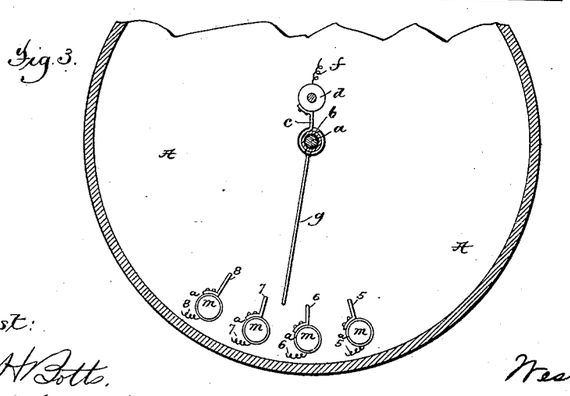
Fig. 3 is a plan view of the circuit-closing mechanism operated by the clock.
Figure 4:
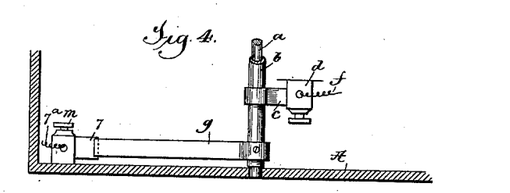
Fig. 4 is a side view of the same.
Figure 5:
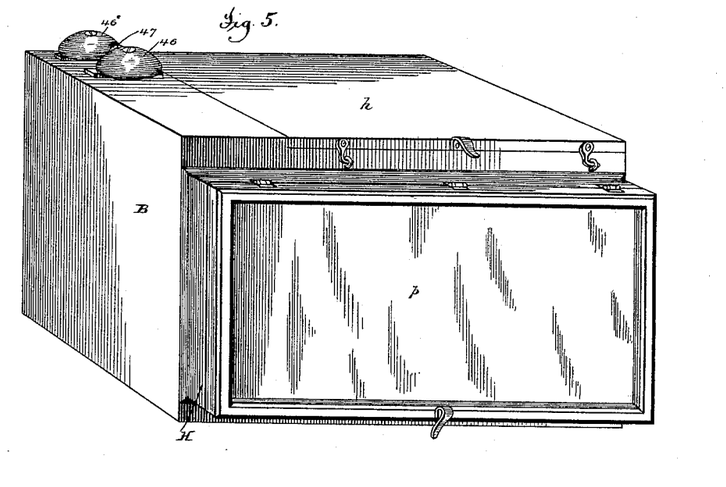
Fig. 5 is a perspective view of the case inclosing one of the alarm and switch mechanisms.

Referring particularly to Figs. 2, 3, and 4, it is to be understood that A represents an ordinary clock or other time-piece, $a$ the shaft of the minute-hand, and $b$ the shaft or sleeve on which the hour-hand is mounted, or any other shaft which is connected with the clock mechanism in such way as to revolve synchronically with the hour-hand. This shaft $b$ turns in contact with a contact-plate, $c$, which extends from a binding-post, $d$, which is fastened to the end of a wire, $f$, which is connected to a battery, as indicated at F, and passes thence to the ground, as indicated at G. (See Fig. 1.)

The shaft $b$ is provided with an arm, $g$, which is rigidly secured to the shaft, and the end of which, as the shaft is revolved, makes contact successively with a number of contact points or plates, 5 6 7 8, &c., corresponding to the hours or fractions of an hour indicated by the clock mechanism. Only four of these plates are illustrated in the drawings; but it is to be understood that the system contemplates the employment of as many as may be desired—one, for example, for each of the twelve hours. The four shown are, however, sufficient to fully illustrate the principle and operation of the system. These plates 5 6, &c., are connected to binding-posts $m$, in which are secured the ends of wires $5^a$ $6^a$, &c., which pass through the several rooms where the alarm mechanisms are to be located.

In practice the arm $g$, the binding-posts, and the plates 5 6, &c., may be located upon the face of the clock, or the hour-hand of the clock may be made to perform the function of the arm $g$, or the arm and contact plates or points may be located at the back of the clock, as indicated in the drawings, or they may be located in any other suitable position, the arrangement being purely arbitrary and merely for the purpose of illustrating one practical way of embodying the invention.

Figure 7:
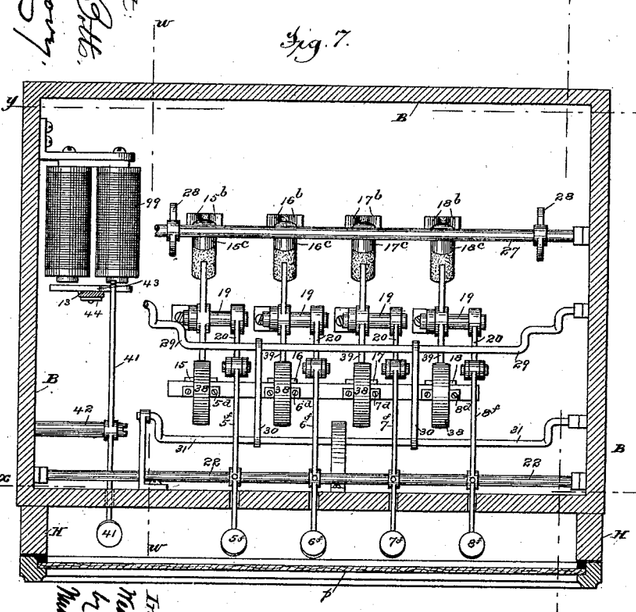
Fig. 7 is a plan view of the switch mechanism, showing also the electro-magnet for releasing the alarm mechanism.
Figure 8:
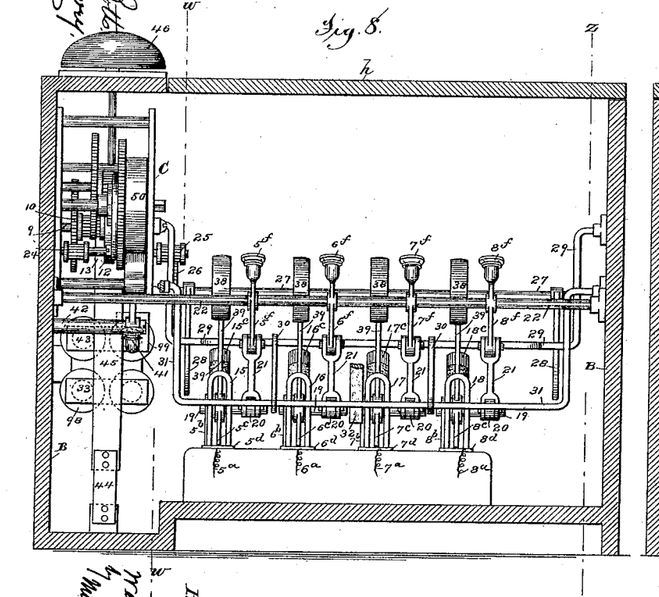
Fig. 8 is a vertical section taken on the line *x x* of Fig. 7.
Figure 9:
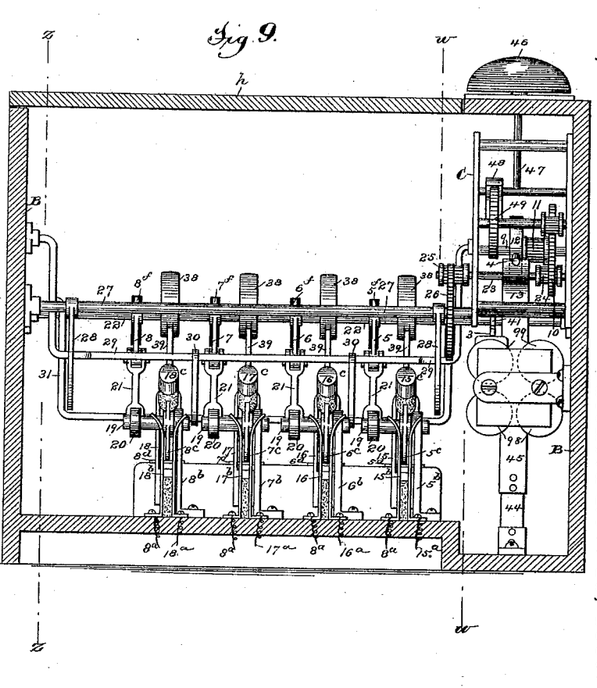
Fig. 9 is a similar view taken on the line *y y* of the same figure.
Figure 10:
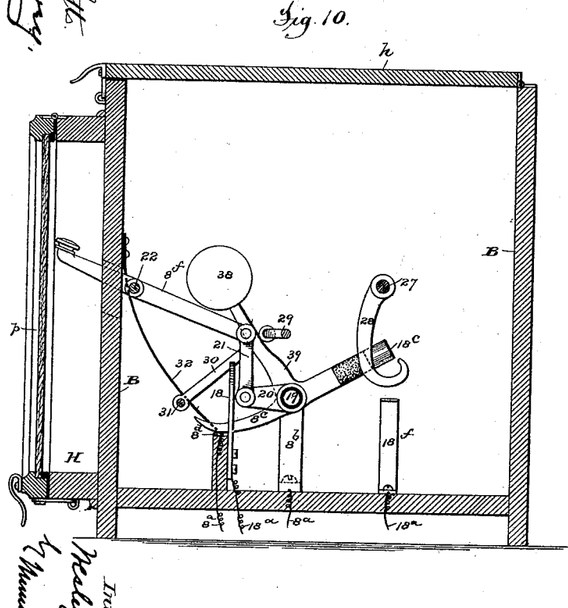
Fig. 10 is a similar view taken on the line *z z* of Figs. 7, 8, and 9.
Figure 11:
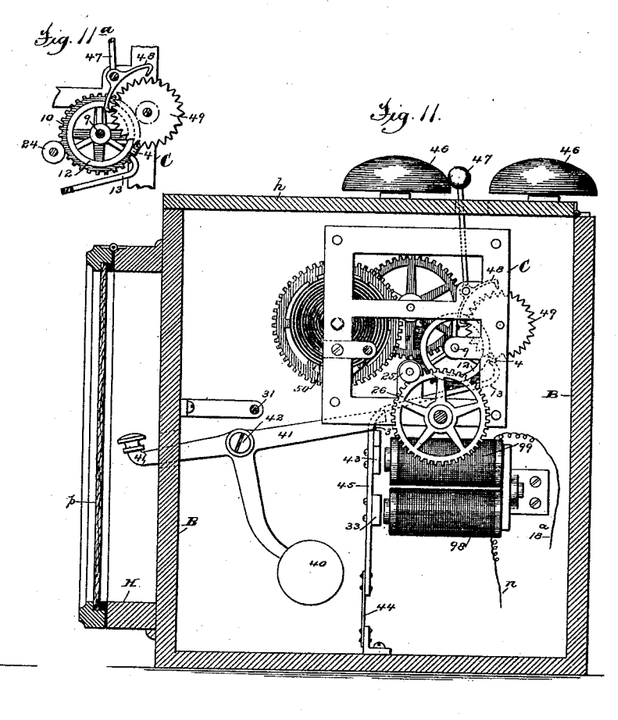
Fig. 11 is a similar view taken on the line *w w* of the same figures, and Fig. 11ª a detail thereof.

Referring now particularly to Figs. 5 to 11, it is to be understood that B indicates a casing, of rectangular or other suitable form, for containing the alarm and switch mechanisms located in each room or other place where an alarm is to be given. This casing is preferably provided with a lid, $h$, by which access can be had to its interior to inspect the mechanism. Located within the casing B, and at one end thereof, or in any other convenient position, is an ordinary alarm mechanism, C, consisting of a train of gearing, which is set in motion by a spring, 50, and is provided with a toothed wheel, 49, which, through an escapement-lever, 48, operates a hammer, 47, so as to ring a bell or pair of bells, 46, whenever the spring 50 is permitted to operate the train of gearing. The shaft 9, which carries the gears 10 11 of the alarm mechanism, is provided with a wheel, 12, upon the periphery of which is formed a stop, 4, which is normally engaged by a detent, 13, so as to prevent the wheel 12 and shaft 9 from revolving and the alarm mechanism from operating. The detent 13 is carried upon the end of a lever, 45, which is provided with a spring, 44, the tendency of which is to rock the lever to such position as to hold the detent 13 in engagement with the stop 4, as shown in Figs. 9 and 11. As illustrated in the present case, the spring 44 also serves as the fulcrum or pivot of the lever 45; but this is not essential. The lever may be pivoted in the ordinary manner and provided with a spiral or other form of spring for holding it in its normal position. The lever 45 carries the armature 43 of an electro-magnet, 99, which when energized attracts its armature 43, so as to rock the lever 45 and carry the detent 13 out of engagement with the stop 4, and thus permit the alarm mechanism to operate.

Fulcrumed upon a stud, 42, extending from the end of the casing B, is a lever, 41, which passes outward through an opening in the side of the case and terminates in a suitable knob or handle, and the inner end of which rests upon the top of the armature 43. The inner end of this lever is provided with a recess forming a shoulder, 3, and the lever is provided with a suitable spring or weight, 40, the tendency of which is to rock the inner end of the lever downward. The shoulder 3 is so positioned that whenever the lever 45 is rocked inward by the energizing of the magnet 99 the armature 43 will be carried out from beneath the shoulder 3, thus permitting the lever 41 to be rocked down by the weight 40, so that the shoulder 3 will engage the armature and hold the lever 45 in the position to which it has been rocked, and thus prevent the detent 13 from coming into engagement with the stop 4 to arrest the alarm mechanism when the magnet is de-energized. The purpose of this arrangement will appear when the operation of the system is explained.

The wires $5^a$ $6^a$, &c., which are connected to the binding-posts of the corresponding contact-plates at the clock A, are connected at their opposite ends to posts $5^b$ $6^b$, &c., which are located in the casing B at the side of the alarm mechanism. Mounted upon these posts are pivoted switches $5^c$ $6^c$, &c., which, when in their normal position, (see Figs. 8 and 10,) rest upon contact-plates $5^d$ $6^d$, &c., which in turn are connected to the wires $5^a$ $6^a$, &c., which are connected to the posts $5^b$ $6^b$, &c., of the next instrument, and so on through all the instruments of the system, and thence through a wire, $k$, to the ground, as indicated at G in Fig. 1.

Located above the ends of the switches $5^c$ $6^c$, &c., is a series of contact-plates, 15 16 17 18, &c., with which the switches contact when thrown out of contact with the plates $5^d$ $6^d$, &c. As shown in the present case, the contact-plates 15 16, &c., are made in the form of loops, which straddle the ends of the switches and serve to arrest the switches at the proper limit of their upward movement. This, however, is not essential, as the plates may be arranged in any other convenient way. These plates are connected by wires $15^a$ $16^a$, &c., with one pole of the magnet 99, and the opposite pole of the magnet is connected by the wires $15^a$ $16^a$, &c., with the wires $5^a$ $6^a$, &c., beyond the contact-plates $5^d$ $6^d$, &c. Each of the wires $5^a$ $6^a$, &c., is thus provided with a loop in which is located the magnet 99. The loop of each of the respective wires $5^a$ $6^a$, &c., is broken by a pair of spring contact-plates, $15^b$ $16^b$, &c., located in line with the switches $5^c$ $6^c$, &c., and upon the opposite sides of the studs $5^b$ $6^b$, &c. The switches $5^c$ $6^c$, &c., are provided upon the opposite side of their fulcra with arms, which carry at their ends insulated circuit-closers $15^e$ $16^e$, &c., which are so positioned that when any one of the switches is rocked into contact with the plate 15 or 16, &c., the circuit-closer $15^e$ or $16^e$, &c., will be carried between the spring contact-plates $15^b$ or $16^b$, &c., thereby connecting the plates so that the current will be sent through the loop and the magnet 99 whenever the arm $g$ closes the circuit through the wire which is connected to the switch which has been thus rocked.

Figure 12:
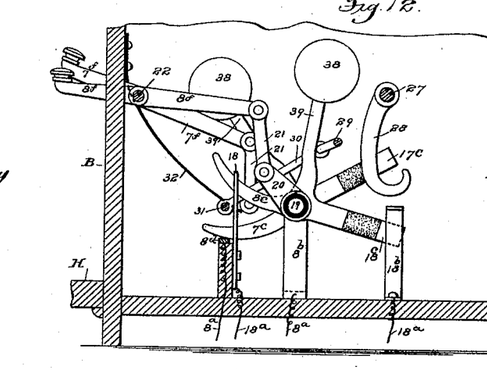
Figs. 12 and 13 are views similar to Fig. 10, showing the parts in different positions to illustrate the operation of the switch mechanism.

The switches $5^c$ $6^c$, &c., are provided with arms 39, carrying weights 38, which are so positioned with relation to the fulcra of the switches that whenever a switch is in its normal position—that is to say, in contact with its plate $5^d$ or $6^d$, &c.—the weight will be thrown on that side of the fulcrum and tend to hold the switch in that position; but whenever a switch is rocked to its opposite position—that is to say, into contact with its plate 15 or 16, &c.—the weight will be thrown upon the opposite side of the fulcrum, and consequently tend to hold the switch in that position. It is to be remarked, however, that the weights 38 are not essential, as any other suitable means—for instance, springs—may be substituted for the weights to perform the same function.

Figure 6:
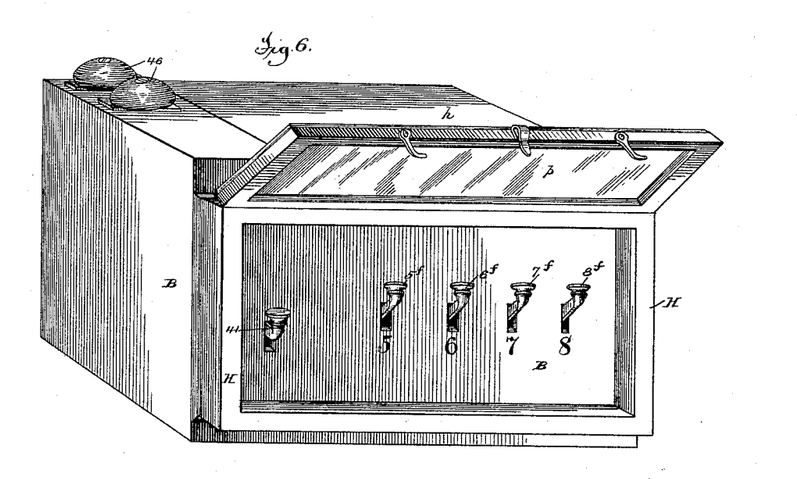
Fig. 6 is a similar view showing the door of the case elevated so as to expose the handles for operating the switches.
Figure 13:
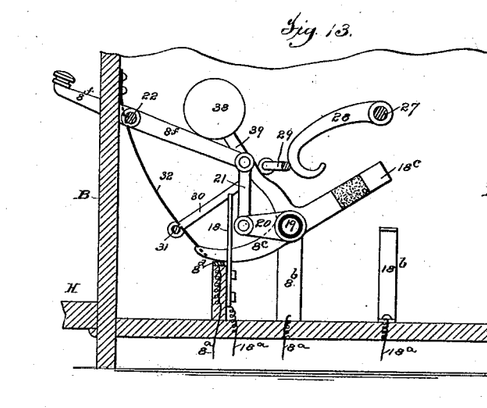

The switches $5^c$ $6^c$, &c., are mounted upon short shafts or studs 19, which are pivoted in the posts $5^b$ $6^b$, &c., and these shafts are provided with arms 20, which are insulated from the shafts, as indicated in Figs. 10, 12, and 13, and are connected by links 21 with a corresponding series of levers, $5^b$ $6^b$, &c., which are fulcrumed upon a rod, 22, or in any other suitable manner, and extend outward through openings in the front of the casing B, as indicated in Fig. 6. From this arrangement either one of the switches can readily be rocked, so as to put the magnet 99 in circuit with either one of the wires $5^a$ $6^a$, &c., at pleasure.

Referring now particularly to Fig. 1, the operation of the system as thus far described will be explained. Let it be first assumed that all of the switches of all the instruments located in the different rooms of the building or in the circuits formed by the wires $5^a$ $6^a$, &c., are in their normal position—that is to say, resting upon the contact-plates $5^d$ $6^d$, &c. As the hour-hand of the clock travels around the dial, the arm $g$, following its movement, will come into engagement successively with the contact-plates 5 6, &c., located in the clock, thereby closing the circuits through the wires $5^a$ $6^a$, &c., successively. As the circuit is closed through each wire—for instance, through the wire $7^a$—the current will pass from the battery through the wire $f$ and contact-plate $c$, thence through the shaft $b$ and arm $g$ to the contact-plate 7 of the clock, thence through the wire $7^a$ to the post $7^b$ of the first instrument, thence through the switch $7^c$ of that instrument to the contact-plate $7^d$, and thence through the wire $7^a$ to post $7^b$ of the next instrument, and so on through all the instruments of the system, and thence through the wire $k$ to the ground. The same effect will be produced as the arm $g$ makes contact successively with each of the contact-plates 5 6, &c. Suppose, however, a guest in a certain room provided with one of the alarm mechanisms desires to be called at seven o'clock, for example. Before retiring he will press the handle of the lever $7^f$ and thereby rock the switch $7^c$ to the position shown by dotted lines in Fig. 1, which is the position of the switch $8^c$ in Fig. 12, thereby carrying the switch out of contact with the plate $7^d$ and into contact with the plate 17, and the circuit-closer $17^e$ into position to connect the spring contact-plates $17^b$ and close the circuit through the magnet 99. When the hour-hand of the clock arrives at seven, the arm $g$ will come into contact with the contact-plate 7 of the clock and the current will, as before, pass from the battery to the post $7^b$ of the instrument in which the switch has been shifted. The current will pass thence through the switch $7^c$; but instead of passing to the contact-plate $7^d$, and so on directly through the main circuit, it will pass through the loop—that is to say, it will pass to the contact-plate 17, thence through the wires $17^a$ $18^a$ to the magnet 99, thence through the wires $18^a$ $17^a$ to the first of the spring contact-plates $17^b$, thence through the circuit-closer $17^e$ to the other of the spring contact-plates $17^b$, thence through the wire $17^a$ to the wire $7^a$, and so on to the post $7^b$ of the second instrument and to the ground, the same as first described. As the current is thus diverted through the magnet 99, the magnet will be energized, thereby attracting its armature 43 and rocking the lever 45, so as to carry the detent 13 out of engagement with the stop 4 and permitting the alarm mechanism to operate. As soon as the lever 45 is thus rocked by the attraction of the armature 43, the lever 41 will be rocked downward, so that the shoulder 3 will engage with the armature 43 and hold the detent 13 out of engagement with the stop 4, so that the alarm mechanism will continue to operate until it runs down or is arrested, as will presently be explained.

If the switches connected with any one of the wires 5ª 6ª, &c., are shifted in any two or more instruments the operation will be the same as described in connection with the one instrument, except that in that case the current will be diverted through the magnets 99 of the several instruments in which the switches are shifted so as to simultaneously set the alarm mechanisms of these several instruments in operation. In securing this operation of the system the circuit-closers 15°, 16°, &c., are important elements, for unless each loop is broken at all times except when its switch is set to give an alarm it might sometimes result that the current after passing through the loop of one circuit would pass to another circuit and thus either operate to give an alarm in that circuit or fail to operate a second alarm in its own circuit.

It is necessary after the magnet of any instrument has been energized and the alarm-mechanism set in motion that the switch which has been shifted to divert the current through the magnet should be restored to its normal position, as, if it were allowed to remain in the position to which it had been shifted the alarm would continue to be sounded at each interval of twelve hours. This can, of course, be done by operating the lever to which the switch is connected, so as to move the switch back to its normal position; but the person in the room where the alarm is sounded might neglect to do this; and, therefore, in order to avoid the necessity of having an attendant inspect all of the instruments every twelve hours it is desirable to provide means by which the switch will be automatically restored to its normal position immediately after the alarm is given. For this purpose the alarm mechanism is provided with a shaft, 23, having two small pinions, 24 25, the former of which is engaged by the gear 10, which drives the toothed wheel 49, and the second of which engages with a wheel, 26, mounted upon a shaft, 27, which extends the length of the casing B and is provided with two cam-shaped arms, 28.

Extending the length of the casing is a rod, 29, which is in the form of a bail and hangs just inside the arms 39 when the latter are in their normal position. The rod 29 is pivoted at its end, so as to swing freely and so that whenever any one of the switches 5° 6°, &c., is rocked the arm 39 will swing the rod 29 inward. The cam-shaped arms 28 are of such length and form that if the rod 29 is swung inward by one of the arms 39, when the shaft 27 is set in motion, they will engage with the rod 29 and swing it outward and thereby, through it and the arm 39 of any switch which has been shifted, restore the switch to its normal position and break the circuit through the magnet 99. From this arrangement it results that whenever the alarm mechanism is put in operation by the energizing of the magnet 99 the shaft 27 will commence to revolve, and during the first revolution of the shaft the arms 28, coming into engagement with the rod 29, will rock the same against the arm 39 of any switch which has been shifted, as shown in Fig. 13, and thus restore the switch to its normal position. As soon as this takes place, the circuit through the magnet 99 will be broken and the magnet de-energized, and this, if means were not provided for preventing it, would at once allow the spring 44 to rock the lever 45 away from the magnet and carry the detent 13 into position to engage the stop 4 and arrest the alarm mechanism. This might, however, result in arresting the alarm mechanism before it had been in operation a sufficient length of time. This, however, is prevented by the lever 41, which operates, as before explained, to hold the detent 13 out of engagement with the stop 4, regardless of the magnet 99. It has been stated and will be readily seen that this would result in permitting the alarm mechanism, when once set in operation, to continue to operate until it had run down, and this in most cases would be very undesirable, as ordinarily the alarm will not be required to operate more than a few seconds. To avoid this, the lever 41 is extended through an opening in the front of the casing B, as before explained, and is provided with a handle by which the person in the room can at any time rock the lever, so as to carry the shoulder 3 out of engagement with the armature 43, and as soon as this is done, the magnet being de-energized, the spring 44 will restore the lever 45 and detent 13 to their normal position and arrest the alarm mechanism.

It is necessary to the successful operation of the system that two of the switches 5° 6°, &c., of any one instrument should not be shifted to close the circuit through the magnet of the instrument at the same time, and as many persons might not be made to understand this from the printed instructions which will, of course, accompany each instrument, or, understanding it, might disobey the instructions, it is desirable to provide means by which it will be rendered impossible to shift a second switch in any instrument until the first has been restored to its normal position. For this purpose the rod 29 is connected by links 30 with a similar rod, 31, which is suspended in such position as to normally lie just outside the ends of the switches 5° 6°, &c., as shown in Fig. 10. When, however, any one of the switches is shifted, as shown in Fig. 12, the arm 39 of that switch, coming into contact with the rod 29 and rocking it inward, as has been described, will, through the links 30, draw the rod 31 inward, so that it will overlie the remaining switches and thus prevent a second switch from being shifted until the first has been restored to its normal position. The rod 31 is acted upon by a light spring, 32, which is of sufficient strength to rock the rods 29 31 outward to the position shown in Figs. 10 and 13 whenever it is permitted to do so, but which is not of sufficient strength to overcome the weight 38 and rock the rods outward when the weight is in the position shown in Fig. 12.

The front of the casing B will ordinarily be provided with a supplemental casing, H, for inclosing the projecting ends of the levers for operating the switches and releasing the lever 45, and this casing will be provided with a glazed or other door, p, which can be opened to gain access to the levers.

Figure 15:
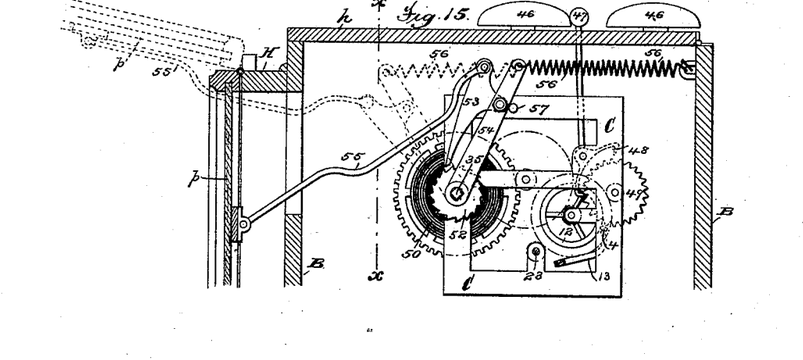
Fig. 15 is a view similar to Fig. 11, illustrating a means for effecting the automatic winding of the alarm mechanism.
Figure 16:
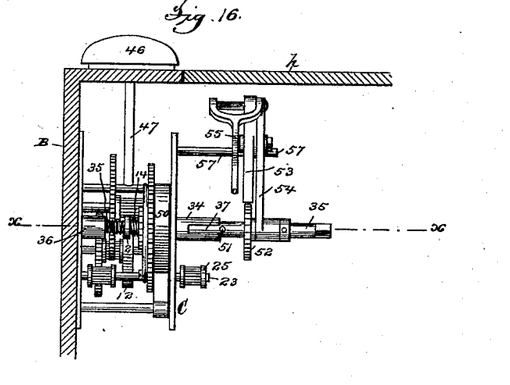
Fig. 16 is a vertical section taken on the line $x$ $x$ of Fig. 15.
Figure 17:
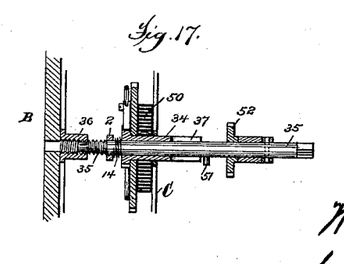
Fig. 17 is a horizontal section taken on the line $x$ $x$ of Fig. 16.

The alarm mechanism may be wound up by an ordinary key, the same as the similar mechanism in ordinary alarm-clocks, and for this purpose an attendant will of course inspect each mechanism at suitable intervals to see that it is in proper working condition. The spring 50 will, however, ordinarily be of such length that the mechanism will not require winding except at considerable intervals. If it should be desired, provision may be made by which the winding of the alarm mechanism may be accomplished automatically. This, however, is not essential; but one form of mechanism suitable for the purpose is illustrated in Figs. 15, 16, and 17 of the present case. For this purpose the main winding-shaft 34 to which the spring 50 of the alarm mechanism is connected is made hollow, (see Fig. 17,) and arranged inside the shaft is a longitudinally-movable spindle, 35, the end of which is threaded and enters a nut, 36, fixed to the frame which supports the alarm mechanism. The spindle 35 is provided with a collar, 2, between which and the shaft is arranged a spring, 14, the tendency of which is to move the spindle toward the nut 36. The end of the tubular shaft 34 is slotted, as shown at 37, and the spindle 35 is provided with a stud, 51, which enters the slot 37 and moves therein as the spindle is screwed into and out of the nut 36, as will be presently explained. The spindle 35 extends beyond the end of the shaft 34, and is provided with a ratchet, 52, which is rigidly fixed thereto, and which is engaged by a pivoted pawl, 53, which is carried by an arm, 54, which is loosely mounted upon the spindle 35. The upper end of the pawl 53 is connected by a rod, 55, with the hinged door p, and the arm 54 is provided with a light spring, 56, the tendency of which is to hold the arm in its normal position against a stud, 57, projecting from the framework.

The operation of the mechanism just described in effecting the automatic winding of the alarm mechanism is as follows: It will be observed that the rod 55 is of such length that when the door p is closed the pawl 53 is rocked to and held in such position as to be out of engagement with the ratchet 52, so that the ratchet and the spindle 35 are free to revolve with the shaft 34 as the spring 50 is unwound. It is also to be remarked that the friction between the shaft 34 and spindle 35 is sufficient to cause the spindle to turn with the shaft when no resistance is offered to such movement of the spindle. Bearing these conditions in mind, it will be seen that whenever the detent 13 is withdrawn from in front of the stud 4, so as to allow the spring 50 to unwind and turn the shaft 34, and thereby operate the alarm mechanism, the spindle 35 will turn with the shaft 34, and the spring 14, pressing the spindle toward the nut 36, the threaded portion of the spindle will enter the nut and at the same time the stud 51 will enter the slot 37 in the shaft 34. As soon as this takes place, the spindle will be locked to and be turned positively by the shaft 34, so that the threaded portion of the spindle will be drawn into the nut, thereby moving the spindle longitudinally through the opening in the shaft 34 and carrying the stud 51 along the slot 37, and this will continue until the alarm mechanism is stopped, as hereinbefore explained, and will be repeated each time the alarm mechanism is operated, thereby carrying the stud 51 farther and farther into the slot 37 as the spring 50 is unwound. Each time, however, that the door p is opened for any purpose—as, for example, to set one of the switches $5^c$ $6^c$, &c., or to operate the lever 41 to stop the alarm mechanism—the rod will as the door commences to open rock the pawl 53, so as to throw it into engagement with the ratchet 52, and after this takes place the continued movement of the door, to fully open it, will rock the arm 54, and thereby turn the spindle 35, and with it the shaft 34, so as to partly wind up the spring 50. As the spindle 35 is thus turned by the pawl 53, the threaded portion of the spindle, instead of being drawn into the nut 36, will be pushed out of the nut, thereby moving the spindle longitudinally in the reverse direction and tending to carry the stud 51 out of the slot 37. By this means the overwinding of the alarm mechanism is prevented, for if for any reason the door p should be opened and closed more frequently than is necessary to keep the spring properly wound, the spindle 35 will, by the time the spring is wound to the proper tension, be moved sufficiently to carry the stud 51 out of the slot 37, and after that the spindle will turn idly until the stud is again carried into the slot by the unwinding of the spring, as already explained. As the spindle 35 is moved longitudinally, as just explained, the arm 54 and the pawl and ratchet 53 52 will, of course, be carried with it; but the rod 55 is so connected to the pawl, as shown in Fig. 16, that this movement does not interfere with the proper operation of the other parts of the apparatus. If at any time the door p should not be opened and closed sufficiently often to keep the spring 50 wound, it can be readily wound by a key applied in the usual manner to the end of the spindle 35.

The invention has thus been described as applied to a call system for hotels for the purpose of conveying a full understanding of its organization and operation, and because the invention is especially adapted for such a system. The invention is, however, applicable to many other purposes, and in some cases it may be desirable to substitute some other form of signal for the simple alarm mechanism shown, and this can, of course, be readily done, if desired.

The particular form and arrangement of the switches and the means for operating them, which are shown, constitute a practical embodiment of the invention; but these details may be readily changed, and they can be varied within wide limits without departing from the substantial features of the invention or losing its advantages.

Figure 14:
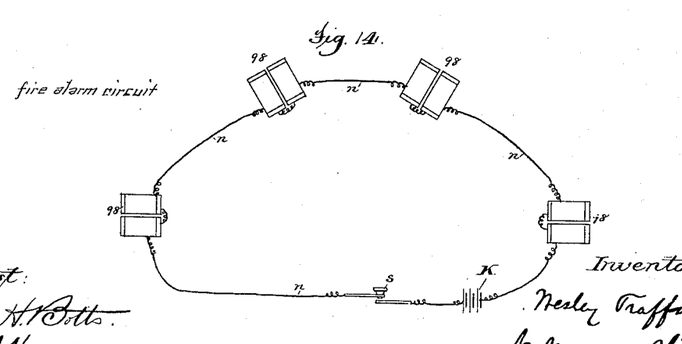

The mechanism which has been described is intended primarily, of course, for sounding an alarm at predetermined times. By slight additions, however, this system may be utilized to sound an alarm simultaneously in all of the rooms to which the system extends. This might be very desirable in the case of a fire, or if for any other reason it became necessary to arouse all the guests at once. To accomplish this, the lever 45 in each instrument is provided with a second armature, 33, which is acted on by a second magnet, 98, located directly below the magnet 99, and the magnets 98 of the several instruments will be included in a single circuit, as $n$, as indicated in Fig. 14. This circuit will be provided with suitable battery-power, as indicated at K, and will pass through the office or other central point, where it will be provided with an ordinary circuit-closer or key, $s$. In order to put the alarm mechanism in each room in operation, it then only becomes necessary to operate the circuit-closer $s$, and all of the magnets 98 will be energized simultaneously, so as to rock the levers 45 and set all of the alarm mechanisms in operation.

It will ordinarily be most desirable to make the magnets 98 99 entirely independent, as illustrated, but this is not necessary. The helices of the two magnets may be wound on the same cores, so that the same cores will be energized and the same armatures attracted whether the current passes over the general alarm-circuit $n$ or over the circuits $5^a$ $6^a$, &c., connected with the clock.

What I claim is—

1. The combination, with an electric circuit, of a circuit-closing apparatus operated by a time mechanism, a plurality of signaling apparatuses, each controlled by an electro-magnet located in a loop connected to said circuit, and a switch for each loop, whereby any one or more of said electro-magnets may be put into or cut out of said circuit, substantially as described.

2. The combination, with a plurality of electric circuits, of a circuit-closing apparatus operated by a time mechanism to close each of said circuits successively, a signaling apparatus controlled by an electro-magnet which is connected by a loop to each of said circuits, and a switch for each loop and circuit, whereby said magnet may be put into any one of said circuits or cut out of all, substantially as described.

3. The combination, with a plurality of electric circuits, of a circuit-closing apparatus operated by a time mechanism to close each of said circuits successively, a plurality of signaling apparatuses, each controlled by an electro-magnet which is connected by a loop to each of said circuits, and a switch for each loop and circuit, whereby any one or more of said magnets may be put into any one of said circuits or cut out of all, substantially as described.

4. The combination, with a plurality of electric circuits, of a circuit-closing apparatus operated by a time mechanism, and arranged to close each of said circuits successively, a signaling apparatus controlled by an electro-magnet which is connected by a loop to each of said circuits, a switch in each of said circuits for sending the current through its loop and the magnet, and a circuit closing and breaking apparatus located in each loop and operated in connection with the switch of that loop and circuit, substantially as described.

5. The combination, with a plurality of electric circuits, of a circuit-closing apparatus operated by a time mechanism and arranged to close each of said circuits successively, a plurality of signaling apparatuses, each controlled by an electro-magnet connected by a loop to each of said circuits, a switch for each loop in each circuit for sending the current through the loop and magnet, and a circuit closing and breaking apparatus located in each loop and operated in connection with the switch of that loop and circuit, substantially as described.

6. The combination, with a plurality of electric circuits and a circuit-closing apparatus operated by a time mechanism for closing said circuits successively, of a signaling apparatus located at a distant point and controlled by an electro-magnet which is connected to each of said circuits, and a switch mechanism located adjacent to said magnet and signaling apparatus, and adapted and arranged to cut said magnet out of or put it into any one of said circuits, substantially as described.

7. The combination, with a plurality of electric circuits and a circuit-closing apparatus operated by a time mechanism for closing said circuits successively, of a signaling apparatus located at a distant point and controlled by an electro-magnet which is connected to each of said circuits, a switch mechanism located adjacent to said magnet and signaling apparatus, and adapted and arranged to cut said magnet out of or put it into any one of said circuits, and connections between said switch mechanism and said signaling apparatus for operating the former to break the circuit through the magnet, substantially as described.

8. The combination, with the alarm mechanism and the switches $5^c$ $6^c$, &c., having the arms 39, of the shaft 27, having arms 28, the rod 29, arranged to engage with the arm 39 and arms 28, and the rod 31, connected to the rod 29, and arranged to be swung inward above the remaining switches when any one of them is shifted, substantially as described.

9. The combination, with the spring 50 and the winding-shaft 34, of the alarm mechanism, said shaft having the slot 37, of the spindle 35, having the stud 51, ratchet 52, and a threaded portion to enter the nut 36, the pawl 53, and connections between the pawl and the door $p$, whereby the movement of the door operates to wind up the spring 50, substantially as described.

10. The combination, with the alarm mechanism and the switches $5^c$ $6^c$, &c., having the arms 39, of the shaft 27, having arms 28, and the rod 29, substantially as described.

11. The combination, with an electric circuit, of a circuit-closing apparatus operated by a time mechanism, a plurality of signaling apparatuses, each controlled by an electro-magnet located in a loop connected to said circuit, a switch for each loop, whereby any one or more of said electro magnets may be put into or cut out of said circuit, a second magnet for controlling each signaling apparatus, and an electric circuit connecting all of said second magnets, substantially as described.

12. A signaling system comprising a time-piece, a series of electric circuits, a circuit-closer operated by said time-piece and arranged to close said circuits successively, electro-magnets for controlling bells located in different apartments, and switches located in said apartments and arranged to connect any one of said bells with any one of said circuits, substantially as described.

In testimony whereof I have hereunto set my hand in the presence of two subscribing witnesses.

WESLEY TRAFFORD.

Witnesses:
J. J. KENNEDY,
J. A. HOVEY.